(12) United States Patent
Neubecker et al.

(10) Patent No.: US 11,320,281 B2
(45) Date of Patent: May 3, 2022

(54) ON-DEMAND VEHICLE IMAGING SYSTEMS AND METHODS

(71) Applicant: Ford Global Technologies, LLC, Dearborn, MI (US)

(72) Inventors: Cynthia Neubecker, Westland, MI (US); Brad Ignaczak, Canton, MI (US); Adil Nizam Siddiqui, Farmington Hills, MI (US); Cheri Hansen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 16/809,014

(22) Filed: Mar. 4, 2020

(65) Prior Publication Data
US 2021/0278227 A1 Sep. 9, 2021

(51) Int. Cl.
*G01C 21/34* (2006.01)
*G05D 1/00* (2006.01)
*H04W 4/021* (2018.01)
*G06K 9/00* (2022.01)

(52) U.S. Cl.
CPC ....... *G01C 21/3461* (2013.01); *G05D 1/0094* (2013.01); *G06K 9/00791* (2013.01); *H04W 4/021* (2013.01); *G05D 2201/0213* (2013.01)

(58) Field of Classification Search
CPC ......... G05D 1/0094; G05D 2201/0213; G06K 9/00791; H04W 4/021; G01C 21/3461
See application file for complete search history.

(56) References Cited

U.S. PATENT DOCUMENTS

| | | | | |
|---|---|---|---|---|
| 9,942,295 | B2* | 4/2018 | Rider | H04L 65/4076 |
| 10,404,946 | B2* | 9/2019 | Kaus | G06Q 10/02 |
| 10,560,497 | B1* | 2/2020 | Smith | H04L 65/1069 |
| 10,916,241 | B1* | 2/2021 | Edwards | H04W 4/021 |
| 11,039,107 | B2* | 6/2021 | Kaus | G06Q 10/02 |
| 2002/0173907 | A1* | 11/2002 | Ando | G08G 1/202 |
| | | | | 701/410 |
| 2013/0162817 | A1* | 6/2013 | Bernal | G06K 9/00228 |
| | | | | 348/143 |
| 2016/0057335 | A1* | 2/2016 | Pisz | H04N 5/23229 |
| | | | | 348/149 |
| 2016/0332572 | A1* | 11/2016 | Gibeau | B60L 53/124 |
| 2016/0371983 | A1* | 12/2016 | Ronning | G08G 1/09626 |

(Continued)

OTHER PUBLICATIONS

"Geofencing where location meets time," Web page <https://www.pickpocket.com/geofencing.html>, 3 pages, retrieved from the internet on Dec. 3, 2020.

*Primary Examiner* — Babar Sarwar
(74) *Attorney, Agent, or Firm* — Frank Lollo; Eversheds Sutherland (US) LLP

(57) ABSTRACT

On-demand vehicle imaging systems and methods are provided herein. An example method includes receiving a first request to obtain an image or video of a target location from a requesting party, determining a vehicle located within a specified distance from the target location, transmitting a second request to the vehicle to obtain the image or video of the target location using a camera of the vehicle, the second request including an identification of the target location, performing at least one aspect of image processing to blur, block, or obscure at least a portion of the image, and transmitting the obtained image or video of the target location to the requesting party.

20 Claims, 4 Drawing Sheets

(56) References Cited

U.S. PATENT DOCUMENTS

| | | | | |
|---|---|---|---|---|
| 2017/0249846 A1* | 8/2017 | Ignaczak | ............ | H04N 5/23219 |
| 2017/0274822 A1* | 9/2017 | Haggerty | ................ | B60R 1/00 |
| 2018/0089899 A1* | 3/2018 | Piemonte | ............. | G06T 15/205 |
| 2018/0265194 A1* | 9/2018 | Gauglitz | .............. | G05D 1/0016 |
| 2019/0251371 A1* | 8/2019 | Diedrich | ............... | G06F 3/0484 |
| 2019/0340876 A1* | 11/2019 | Northrup | ................ | H04L 63/08 |
| 2020/0090224 A1* | 3/2020 | Falconer | ............... | B60K 35/00 |
| 2021/0104060 A1* | 4/2021 | Stein | ...................... | G01C 21/28 |
| 2021/0190523 A1* | 6/2021 | Stumpf | ............. | G01C 21/3476 |
| 2021/0209648 A1* | 7/2021 | Woo | .................. | G06Q 30/0269 |

* cited by examiner

ON-DEMAND VEHICLE IMAGING SYSTEMS AND METHODS

FIELD

The present disclosure is generally directed to systems and methods that provide on-demand media, such as images and video, obtained from onboard vehicle cameras.

BACKGROUND

The ability to view real-time video/imaging of remote locations offers users peace of mind and is an area of increasing interest. In many cases, it would be impractical for an individual to install and maintain imaging and/or audio systems in many non-developed areas of interest, but cloud connected vehicles equipped with cameras may pass these areas regularly.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein provide an on-demand service for accessing media obtained from camera equipped vehicles. The systems and methods can be configured to utilize a mobile device-based application to access image data from vehicles within a range of a specific area of interest. The vehicles can be equipped with imaging technology and broadcast systems which send imagery to a cloud service. Access to this video data can be made available in an on-demand manner.

Several optional mechanisms can be added to enhance security of the information and control access thereto. For example, the systems and methods can be configured to provide global blocking of video access through use of a black list. Another security mechanism could include the exclusion of video from certain geo-fenced areas. Vehicles in these geo-fenced areas may be prevented from providing feed video. Examples of excluded or restricted areas can include, but are not limited to, airports, schools, national security-critical zones, or even cities with regulations limiting video recording. Personalized access can be implemented using a white list where a property owner can provide a list of users who may access the service to review available imagery. A vehicle owner can opt-in or out of providing media. For example, an owner of the vehicle can choose whether they will feed the service with video from their platform. Incentives may be provided to vehicle owners to motivate them to opt-in.

In sum, the systems and methods herein allow users to receive images of area of interest on demand and without the need to invest in imaging technology. The systems and methods herein allow users to receive a broader range of images and field of view (FOV), which currently may not be available on personally owned stationary imaging systems.

Illustrative Embodiments

Figure 1:
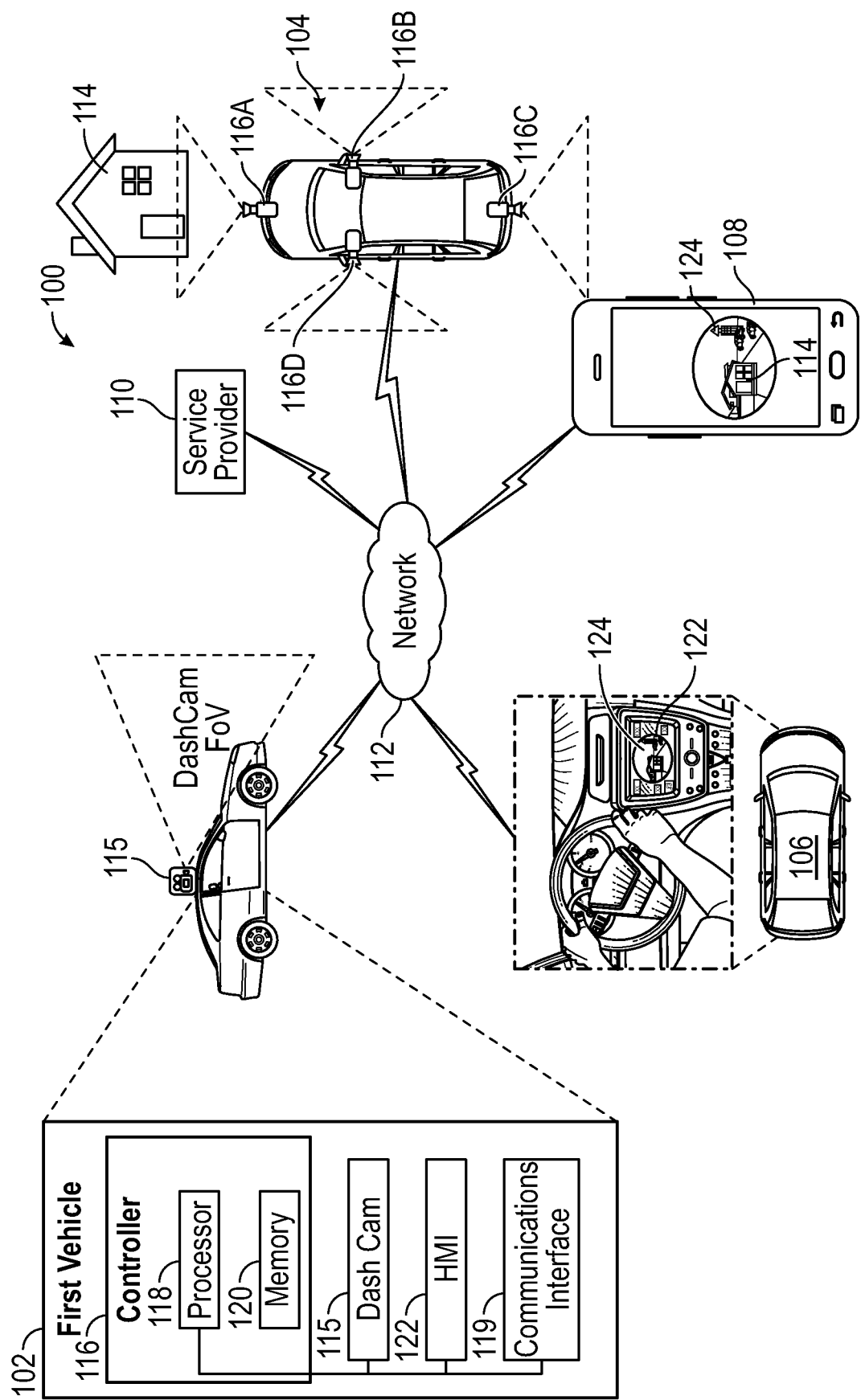
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 generally includes a first vehicle 102, a second vehicle 104, a third vehicle 106, a mobile device 108, and a service provider 110. Each of the components of the architecture 100 can be communicatively coupled to one another over a network 112. This network 112 can comprise any one or a combination of short-range or long-range wireless communications such as Bluetooth, Bluetooth Low Energy, Near-Field Communications, Wi-Fi, cellular, dedicated short-range communications (DSRC), radio frequency (RF), ZigBee, Z-Wave, and the like, or any suitable communications protocol(s).

The first vehicle 102 can be equipped with a dash cam 115 that obtains images of a field of view (FoV) in front of the first vehicle 102. The second vehicle 104 can comprise a plurality of cameras 116A-116D that obtain images from various vantage points around the second vehicle 104. The third vehicle 106 possesses no image capturing devices.

In one use case, the mobile device 108 belongs to an owner of the real property 114. The term owner may encompass any person or entity with authoritative control over a property, including, but not limited to, a leasing company, a renter, or the like. The owner of the real property 114 may not have a camera installed at the real property 114. In order to obtain images of the real property 114, the owner can request images from the service provider 110. The service provider 110 can dispatch the first vehicle 102 to obtain images of the real property 114. The first vehicle 102 can transmit the images directly to the mobile device 108 used by the owner of the real property 114. In another example, the first vehicle 102 can transmit the images to the service provider 110, who forwards the images to the mobile device 108.

In another use case, an operator of the third vehicle 106 can use the mobile device 108 to obtain images or video from the first vehicle 102 and/or the second vehicle 104 through use of the service provider 110. That is, the first vehicle 102 and/or the second vehicle 104 can obtain images or video and broadcast these images or video to the service provider 110. The mobile device 108 can obtain the images or video from the service provider 110 through an application residing on the mobile device 108. These images and video can be obtained on-demand, in real-time or as desired by a user. The mobile device 108 need not be associated with an operator of the third vehicle 106. In an example use case, the mobile device can be used to obtain images of any location, such as real property 114 from the service provider 110. For example, images and/or video of the real property 114 can be obtained from the first vehicle 102 and/or second vehicle 104 as it passes by the real property 114. In another use case, the operator of the third vehicle 106 could request images from the service provider 110 to assess potential traffic issues along a navigation route for the third vehicle 106.

Thus, the on-demand image and video service provided by the service provider 110 allows individuals who do not have imaging systems to remotely view a property or target location of interest from the perspective of cars driving past. Public areas, such as parks, streets, and parking lots, could be remotely viewed before visiting. This could provide individuals with various types of information, ranging from environmental conditions to crowd levels or many other use cases. Images and video can be obtained of rural areas such as national parks which may interest users curious about current conditions (congestion, weather, traffic, wildlife) or the state of key attractions (events, monuments, natural phenomena).

Each vehicle that can be equipped with one or more cameras may include a controller 116 that is configured to obtain images and video and transmits the same back to the service provider 110. For example, the first vehicle 102 can comprise a controller 116 that includes a processor 118 and memory 120. The memory 120 stores instructions that can be executed by the processor 118 to perform aspects of image and video capturing and broadcasting. When referring to operations executed by the controller 116 it will be understood that this includes the execution of instructions by the processor 118. The controller 116 can be configured to broadcast GPS location, available camera information, and images/video to the service provider 110 using a communications interface 119. The controller 116 can cause the activation or disabling of alerts/requests from the service provider 110. In some instances, the alerts are displayed on a human machine interface as disclosed in greater detail below. The controller 116 can also maintain a list of service requests and any compensation provided in return for completing the service requests. For example, the owner of the vehicle can be compensated for obtaining and broadcasting content, either in response to specific requests or on a continual basis as the vehicle is operated.

As noted above, the mobile device 108 can execute an application that allows a user to request images or video from the service provider 110. The user can subscribe to the media sharing service from the service provider 110 by creating an account. As will be discussed below, the account can have certain privileges associated therewith which enable various security features. Some security features relate to the user and some security features relate to geographical locations. In some instances, users or vehicle owners an opt-in or opt-out of participating in the media sharing service.

Using the application, the user can request images or video of a specified location. Depending on the availability of information, user may receive a notification alerting her/him to the status of the feature/service from the service provider 110.

The mobile device 108 can receive images in response to the request from the service provider 110. In some instances, the images or media can be stored on the mobile device 108 and/or at the service provider 110. The notice received from the service provider 110 could be displayed on the mobile device 108 or on a human machine interface (HMI) 122 of a vehicle, such as the third vehicle 106.

In one configuration, the mobile device 108 can receive a request to obtain images or video of a certain geographical location, referred to as a target location of interest. The example provided above could include geographical coordinates of the real property 114. Once a request is received by the service provider 110, the service provider 110 can determine vehicles which are present in the requested geographical location. This could include determining if one or more vehicles are within a specified distance from the target location. For example, the service provider 110 can determine if the vehicles are within five miles of the target location. The specified distance can be configured as desired and this example is not intended to be limiting.

Relative vehicle-to-target location distances can be determined from GPS signals provided by each of the vehicles. For example, the first vehicle 102 can transmit its current location to the service provider 110 for tracking, if the first vehicle 102 has opted-in to participate in the media sharing service. The first vehicle 102 can also share other vehicle data such as vehicle speed, heading, navigation routes, which can be used to determine not only where the vehicle is currently, but where the vehicle is going. The service provider 110 can also select one or more appropriate vehicles based on the nature of the request. For example, if the request specifies a need for 360 degree images or video, the service provider 110 may request images from the second vehicle 104 rather than the first vehicle 102.

The service provider 110 could also provide the user of the mobile device application with options, where the user could select from various vehicles with different image or video capturing capabilities. If no vehicle is in the general vicinity of the target location or is scheduled to pass by the target location, the service provider 110 can transmit a request to any vehicles registered with the service provider 110 to drive to the target location and obtain images or video. In some instances, a responding vehicle can be compensated for this service similarly to a ride-hailing service where a driver is compensated for transporting a customer to a location of interest.

The service provider 110 can be configured to maintain user access to the image/video sharing service both from requesting users and participating vehicle owners. The service provider 110 can determine capabilities or attributes of participating vehicles that identify, for example, number of cameras and camera type (e.g., color, night-vision, black and white). The service provider can select one or more potential participating vehicles for a request based on these capabilities or attributes, in addition to the current location of the participating vehicles. The service provider 110 can request for a specifically equipped vehicle based on time of day. For example, based on time of the day, the service provider 110 can request images from vehicles equipped with a thermal camera to look for specific objects of interest at night.

As noted above, the service provider 110 can transmit images or video of a target location, such as the real property 114. For example, images/video 124 of the real property 114 can be displayed on the mobile device 108. Alternatively, the images/video 124 of the real property 114 can be displayed on the HMI 122 of the vehicle 106.

The service provider 110 can also be configured to perform one or more types of image/video processing on the images/video obtained from a participating vehicle. For example, the service provider 110 can be configured to adjust a FOV to target area of interest. In some instances, the FOV to target area of interest can be done in a post-processing operation using digital cropping, zooming, and other transformations (e.g., pan, tilt, distortion correction, super resolution, etc.). In another example, the service provider 110 can be configured to blur, block, and obscure images or portions of images collected from restricted areas as specified by user base. That is, users of the image sharing service provided by the service provider 110 can designate certain geographical locations as restricted areas. Images or video obtained in a restricted area can be constrained through blurring, blocking, and obscuring portions or all of the images or video. In some instances, geographical locations can be designated on a blacklist. Geographical coordinates of a location on a blacklist identify locations where no images or video may be obtained. Thus, rather than a processed image that includes blurring, blocking, and obscuring of image/video data, no images are obtained of these geographical areas on the blacklist. Thus, when a request is received from a user for images or video of a blacklisted area, the service provider 110 can return a warning message to the user (for example through the HMI 122) that the requested area is a blacklisted area.

Figure 2:
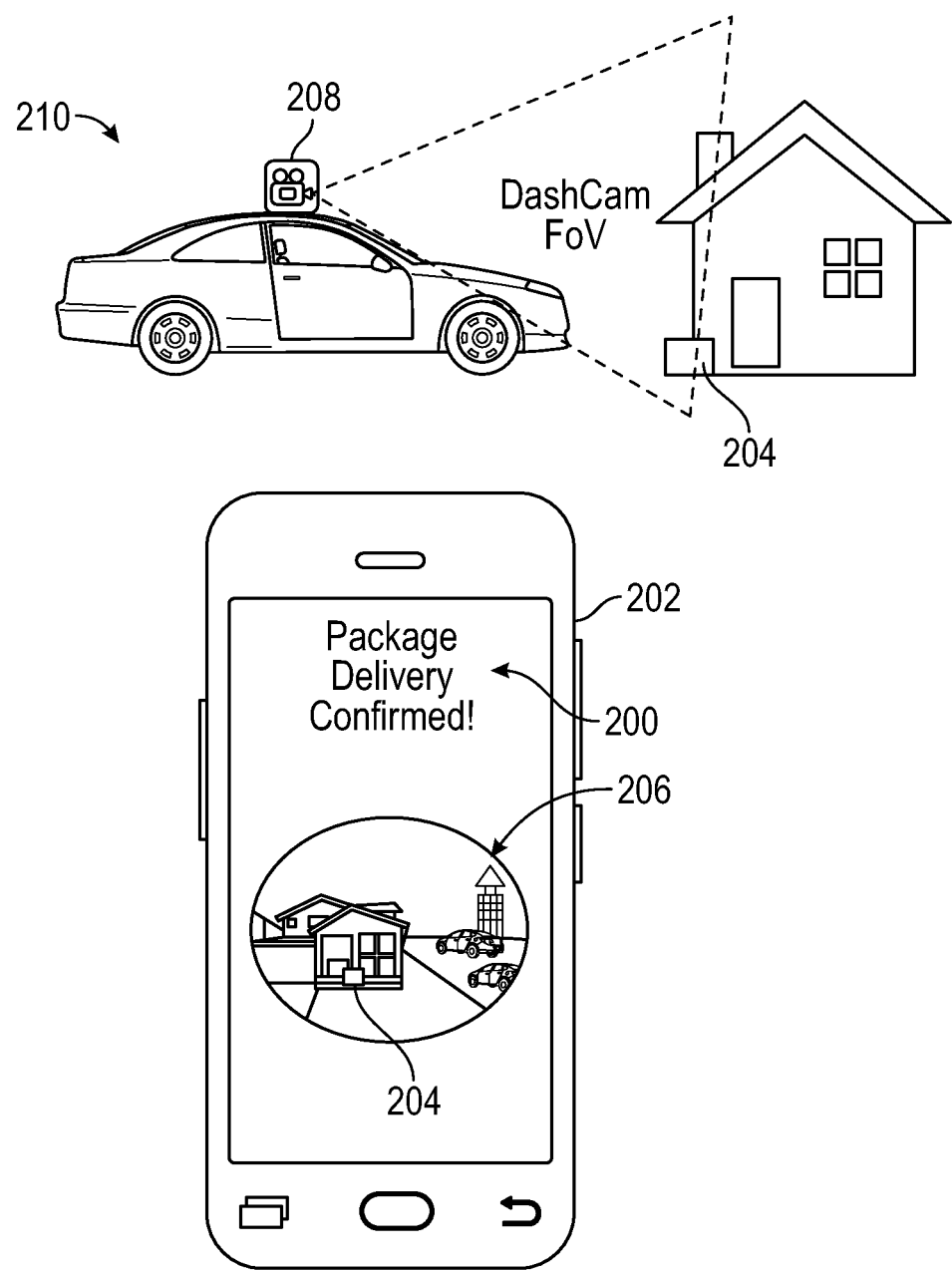
FIG. 2 diagrammatically illustrates an example use case where techniques and structures for providing the systems and methods disclosed herein may be implemented.

The service provider 110 can also be configured to perform image analysis to identify objects in the images. For example, the image processing could be used to identify boxes (e.g., packages delivered to a home or office), vehicle presence, lights in a window, and so forth. The user could specify that service provider 110 should process the images or video to determine if a package has been delivered to their home. The service provider 110 can trigger an alert to a user when a specified object, such as a package, is present in an image. FIG. 2 illustrates an example process where an alert 200 is displayed on a mobile device 202 that a package 204 has been identified from an image 206 obtained from a vehicle camera 208 of a vehicle 210.

Figure 3:
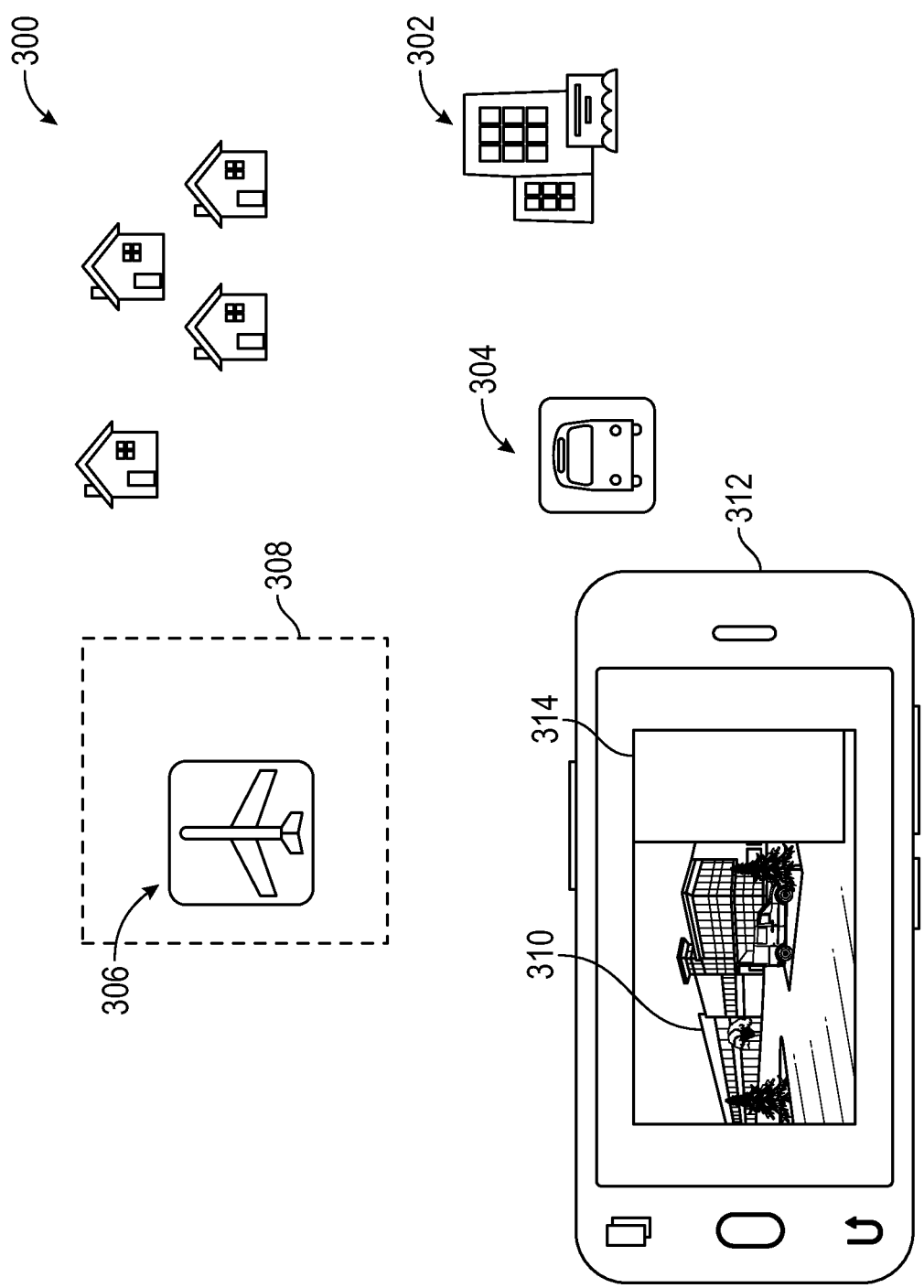
FIG. 3 diagrammatically illustrates another example use case where techniques and structures for providing the systems and methods disclosed herein may be implemented.

FIG. 3 illustrates an example map of geographical locations. The geographical locations could include a neighborhood 300, a business park 302, a bus station 304, and an airport 306. In this example, the airport 306 is cordoned off using a virtual geofence 308. When a request for images or video is received that includes coordinates that fall within the virtual geofence 308 around the airport 306, the request is denied and a warning message can be displayed to a user through their mobile device. In one example, an image 310 is displayed on a mobile device 312 that includes a censored portion 314. This censored portion includes a partial view of information included in the virtual geofence 308. The virtual geofence 308 can be added to a blacklist in some instances. Rather than using virtual geofence coordinate, the blacklist could include physical addresses.

Figure 4:
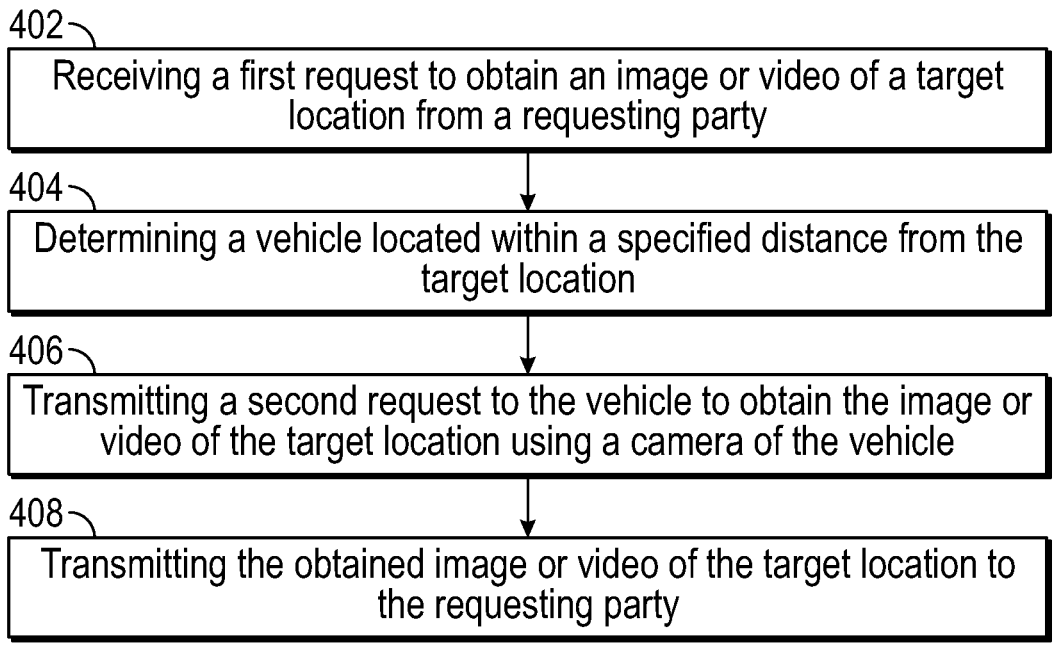
FIG. 4 is a flowchart of an example method of the present disclosure.

FIG. 4 is a flowchart of an example method of the present disclosure. The method includes a step 402 of receiving a first request to obtain an image or video of a target location from a requesting party. For example, a service provider can receive a request from a user registered with the service provider. In some instances, the request can be received from a mobile device of the user that is executing a mobile device application or program. The request can identify geophysical coordinates of the target location. In other instances, the request can be received from an autonomous vehicle (AV) requesting what is happening in a certain area. In this manner, the word "party" may refer to an individual, a vehicle, a computing device, or any suitable entity.

The method can also include a step 404 of determining a vehicle located within a specified distance from the target location. Just as with requesting parties, vehicles registered with service provider can periodically (or upon request) report their respective locations using GPS information. The vehicles can also report their current speed, current direction (e.g., heading), or other vehicle operating information to the service provider.

Once the service provider determines which one or more of the vehicles should be asked to obtain images or video of the target location, the method can include a step 406 of transmitting a second request to the vehicle to obtain the image or video of the target location using a camera of the vehicle. The second request can include an identification of the target location such as a physical address or geophysical coordinates of the target location. Once the images or video are obtained of the target location from the requested vehicle, the method can include a step 408 of transmitting the obtained image or video of the target location to the requesting party.

Figure 5:
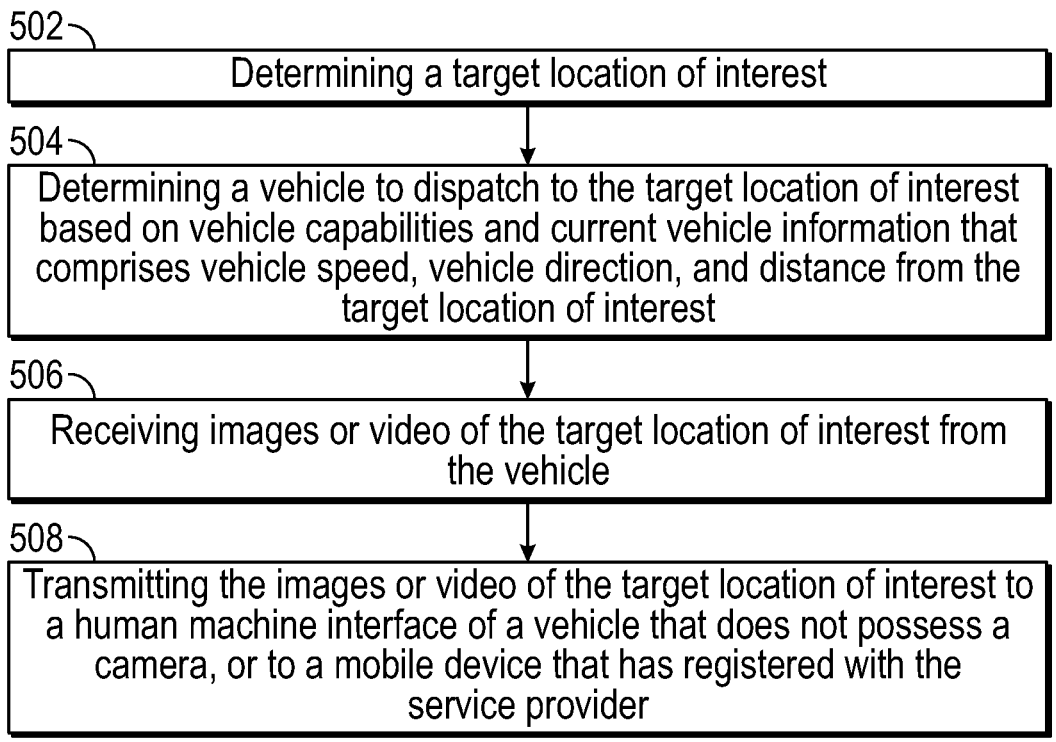
FIG. 5 is a flowchart of another example method of the present disclosure.

FIG. 5 is a flowchart of an example method of the present disclosure. The method can include a step 502 of determining a target location of interest. The method can include a step 504 of determining a vehicle to dispatch to the target location of interest based on vehicle capabilities and current vehicle information that comprises vehicle speed, vehicle direction, and distance from the target location of interest. To be sure, the vehicle being one of a plurality of vehicles that have registered with a service provider. The vehicle capabilities can indicate a number and/or type of camera(s) possessed by the vehicle. The service provider can assess which of a plurality of available and registered vehicles should be used based on the parameters of the request. The selection of the vehicle could also depend on a time of day or an immediacy of a need for the images. If time is of the essence (as identified in the request), a vehicle could be selected based on proximity to the target location of interest.

The method can include a step 506 of receiving images or video of the target location of interest from the vehicle, as well as a step 508 of transmitting the images or video of the target location of interest to a human machine interface of a vehicle that does not possess a camera, or to a mobile device that has registered with the service provider.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:
1. A method, comprising:
receiving a first request to obtain an image or video of a target location from a requesting party;

determining a plurality of vehicles for obtaining the image or video of the target location based at least in part on the plurality of vehicles being located proximate to the target location;

determining a first vehicle of the plurality of vehicles to obtain the image or video of the target location based on a nature of the first request and a respective configuration of image capturing devices on each of the plurality of vehicles;

transmitting a second request to the first vehicle to obtain the image or video of the target location using a camera of the first vehicle, the second request comprising an identification of the target location;

performing image processing on the obtained image or video, wherein the image processing comprises blocking, blurring, and/or obscuring at least a portion of the obtained image or video based on a restriction associated with the target location; and transmitting the processed image or video of the target location to the requesting party.

2. The method according to claim 1, wherein the second request identifies a camera type used to obtain the image or video of the target location, and wherein the camera type comprises at least one of: color, night-vision, or black and white.

3. The method according to claim 2, wherein the camera type selected is based on a time of day, resolution, dynamic range, field of view, and analysis of quantity of points on target based on a distance from a road to the target location.

4. The method according to claim 1, wherein the image processing comprises adjusting a field of view of the target location.

5. The method according to claim 4, wherein the restriction associated with the target location is established by an owner of a property associated with the target location.

6. The method according to claim 1, further comprising:
determining when the target location comprises a restricted location by identifying if the target location is within a virtual geofence area of a blacklist; and
transmitting a warning message to the requesting party that the target location comprises the restricted location.

7. The method according to claim 1, further comprising performing image processing on the obtained image or video to identify an object in the obtained image or video through pattern recognition, wherein the object is a package or lights.

8. A system, comprising:
a processor; and
a memory for storing instructions, the processor executing the instructions to:
receive a first request to obtain an image or video of a target location from a requesting party;
determine a plurality of vehicles for obtaining the image or video of the target location based at least in part on the plurality of vehicles being located proximate to the target location;
determine a first vehicle of the plurality of vehicles to obtain the image or video of the target location based on a nature of the first request and a respective configuration of image capturing devices on each of the plurality of vehicles;
transmit a second request to the first vehicle to obtain the image or video of the target location using a camera of the first vehicle, the second request comprising an identification of the target location;
receive the obtained image or video from the first vehicle;
block, blur, or obscure at least a portion of the obtained image or video based on a restriction associated with the target location; and
transmit the obtained image or video of the target location to the requesting party.

9. The system according to claim 8, wherein the processor is configured to:
determine when the target location comprises a restricted location by identifying if the target location is within a virtual geofence area of a blacklist; and
transmit a warning message to the requesting party that the target location comprises the restricted location.

10. The system according to claim 8, wherein the processor is configured to process the obtained image or video to identify an object in the obtained image or video through pattern recognition, and wherein the object is a package or lights.

11. The system according to claim 8, wherein the second request identifies a camera type that is to be used to obtain the image or video of the target location, and wherein the camera type comprises at least one of: color, night-vision, or black and white.

12. The system according to claim 11, wherein the camera type selected is based on a time of day, resolution, dynamic range, field of view, and analysis of quantity of points on target based on a distance from a road to the target location.

13. The system according to claim 11, wherein a plurality of images are obtained around the vehicle of the target location using a plurality of cameras of the first vehicle.

14. The system according to claim 11, wherein the processor is configured to apply image processing to the obtained image or video prior to transmitting the obtained images of the target location to the requesting party, the image processing comprising adjusting a field of view of the target location.

15. The system according to claim 14, wherein the restriction associated with the target location is established by an owner of a property associated with the target location.

16. A method, comprising:
determining a target location of interest;
determining a plurality of vehicles that have registered with a service provider for obtaining an image or video of the target location of interest based at least in part on the plurality of vehicles being located proximate to the target location of interest;
determining a first vehicle of the plurality of vehicles to obtain the image or video of the target location of interest based on a nature of the first request, a respective configuration of image capturing devices on each of the plurality of vehicles, and current vehicle information comprising vehicle speed, vehicle direction, and distance from the target location of interest;
dispatching the first a vehicle to the target location of interest;
receiving images or video of the target location of interest;
performing image processing on the images or video in accordance with a restriction established for the target location of interest; and
transmitting the images or video of the target location of interest to a human machine interface of a vehicle that does not possess a camera, or to a mobile device that has registered with the service provider.

17. The method according to claim 16, further comprising determining when the target location of interest comprises a restricted location by identifying if the target location of interest is within a virtual geofence area of a blacklist.

18. The method according to claim 17, further comprising transmitting a warning message to a requesting party that the target location of interest comprises the restricted location.

19. The method according to claim 18, further comprising processing the images or video to identify an object in the images or video through pattern recognition, wherein the object is a package or lights.

20. The method according to claim 19, further comprising determining a camera type that is to be used to obtain the images or video of the target location of interest, wherein the camera type comprises at least one of: color, night-vision, or black and white.

* * * * *